Dec. 31, 1935.     R. E. SLAYTON     2,025,784
FOWL PLUCKING DEVICE
Original Filed June 6, 1923     3 Sheets-Sheet 1
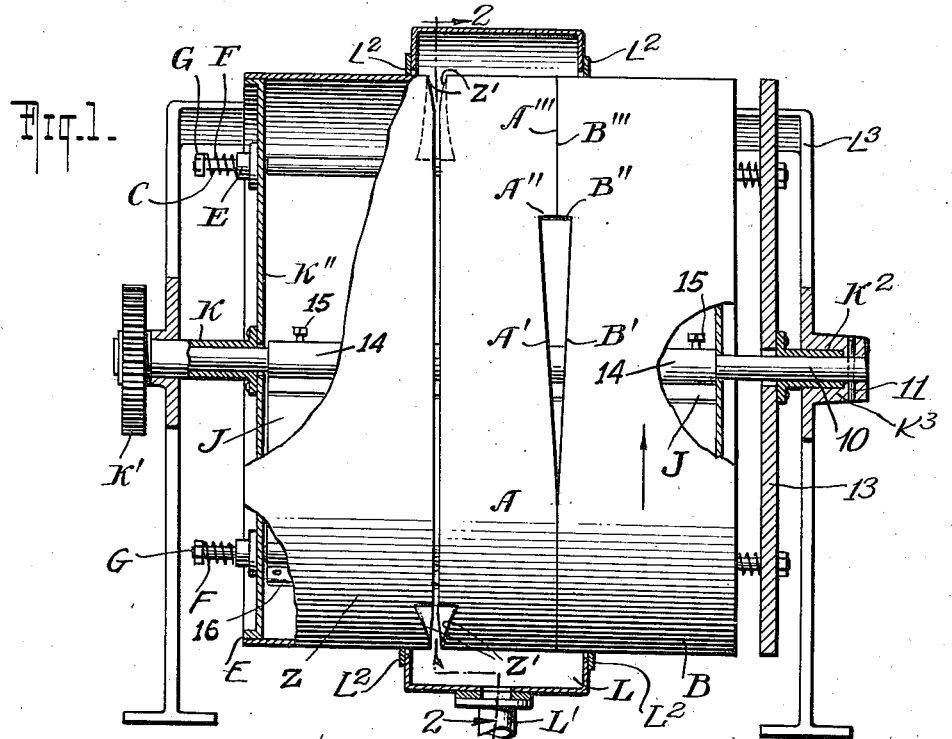
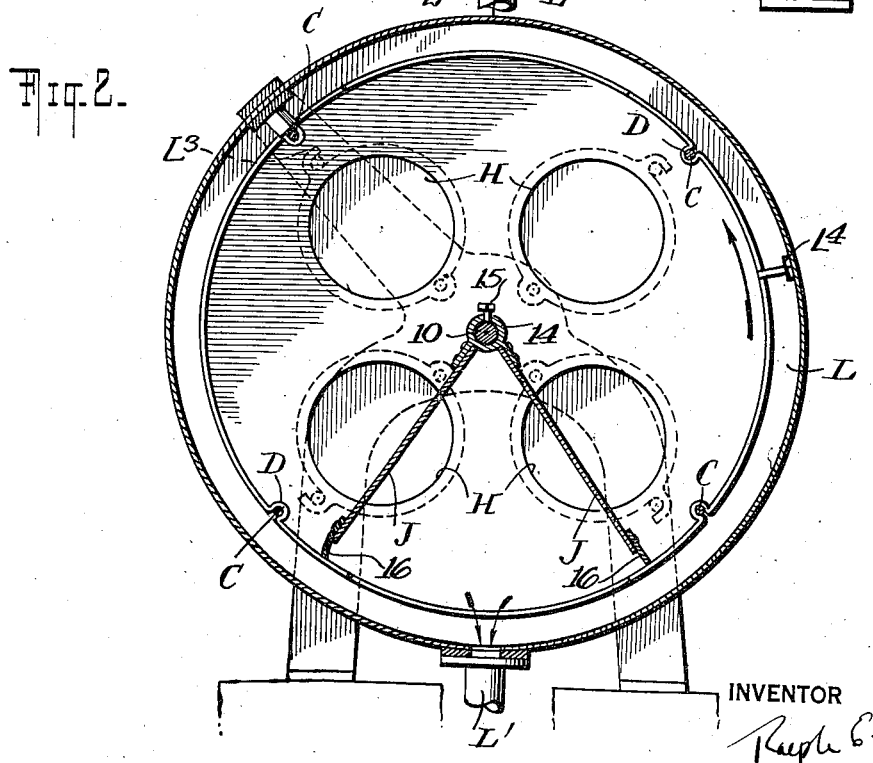
INVENTOR
Ralph E. Slayton Dec. 31, 1935. R. E. SLAYTON 2,025,784
FOWL PLUCKING DEVICE
Original Filed June 6, 1923 3 Sheets-Sheet 2
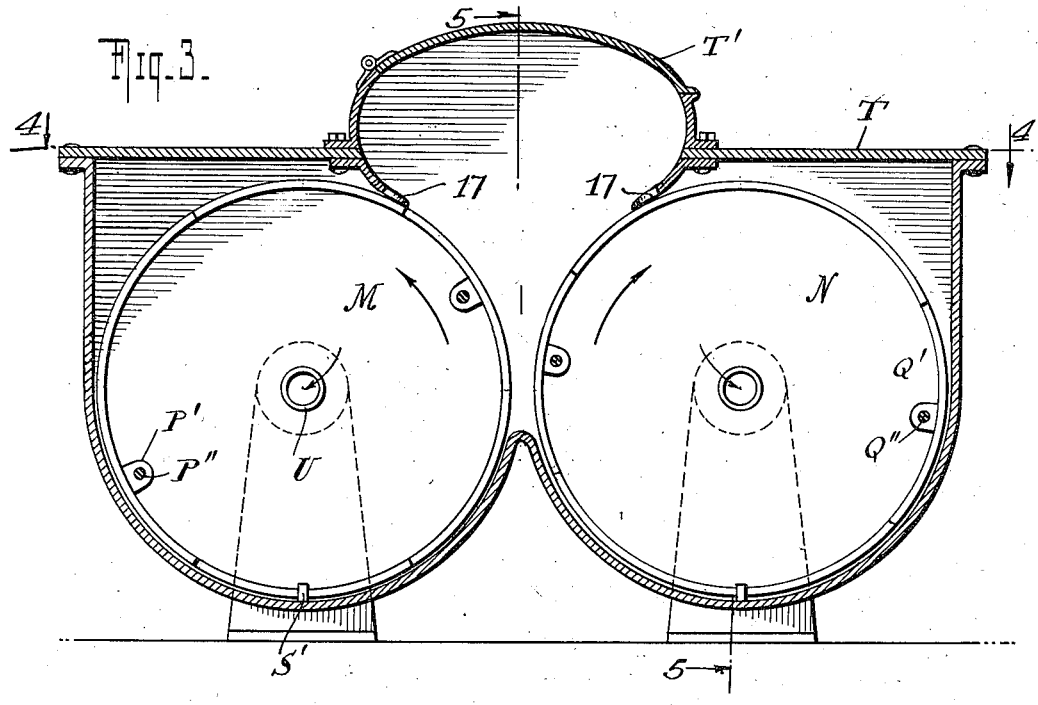
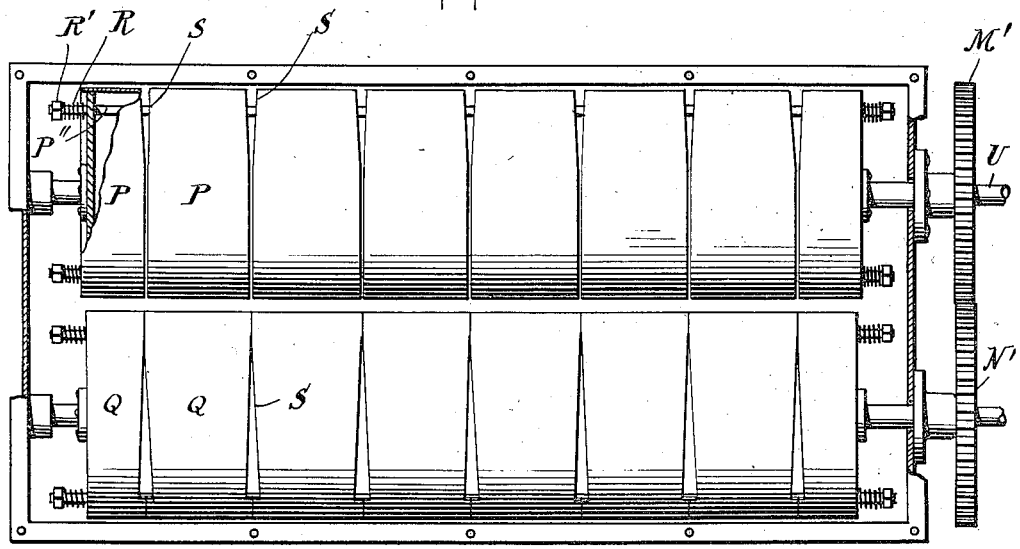
INVENTOR
Ralph E. Slayton

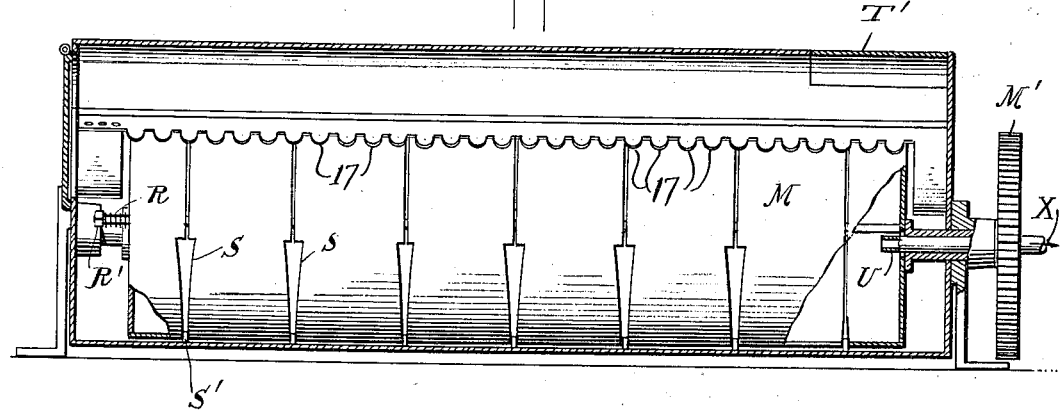
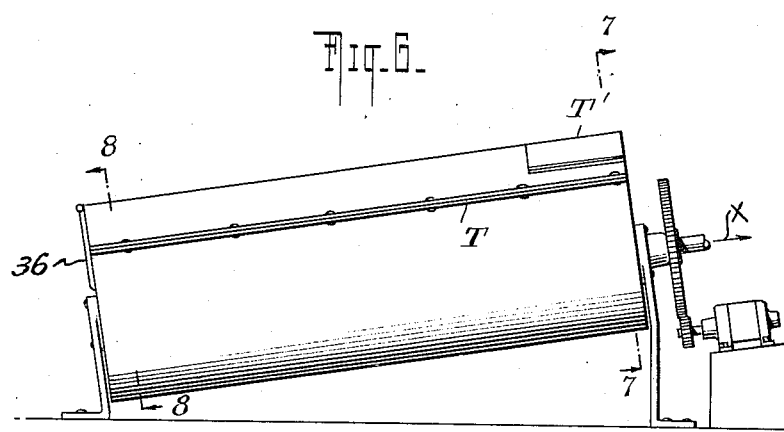
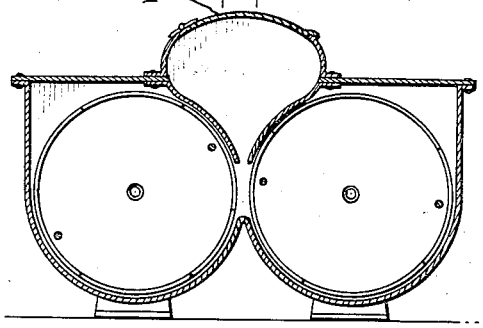
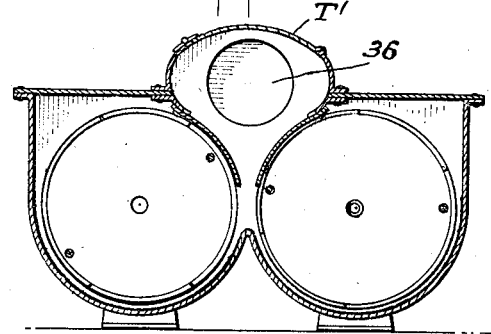

Patented Dec. 31, 1935

2,025,784

UNITED STATES PATENT OFFICE 2,025,784

FOWL PLUCKING DEVICE

Ralph E. Slayton, Montclair, N. J.

Application June 6, 1928, Serial No. 283,260
Renewed September 16, 1933

5 Claims. (Cl. 17—11)

This invention relates to plucking devices and has more particular reference to a device for plucking the feathers from fowl.

The present invention aims to provide a device for plucking the feathers from fowl in a substantially automatic manner, without necessitating the services of skilled attendants and which will pluck a fowl fairly clean.

Comprehensively stated, one phase of the invention comprises rotatable plucking means which are inclined from the horizontal so as to provide a gravity feed for the fowls; another phase of the invention resides in means to stretch the skin of the fowl, while another phase comprises means to grip the feathers by forcing them into tapered openings which move relatively to the fowl. A still further phase resides in the provision of means of moving the object relatively to the gripping means.

More specifically stated the invention comprises adjacently disposed rotatable members, rotating in opposite directions, the members being so placed that the object may be placed in the trough found between these members without passing downwardly between them, the members being inclined to the horizontal so that the object will slide from one end to the other, the plucking means operating to remove the feathers while the object is sliding from one end of the inclined members to the opposite end.

In the drawings accompanying this specification, several embodiments of the invention are illustrated, although it is to be understood that such embodiments are merely for the purpose of affording a clear understanding of the underlying principles of the invention so that those skilled in the art may readily understand it without, however, limiting the invention to the specific details shown therein.

In said drawings.

Fig. 1 is a side elevation of one modification partly in section and partly fragmentary.

Fig. 2 is a section of Fig. 1 on the line 2—2.

Fig. 3 is a vertical section of another modification.

Fig. 4 is an enlarged sectional view of Fig. 3 on the line 4—4.

Fig. 5 is a reduced sectional view of Fig. 3 on the line 5—5.

Fig. 6 is a side elevation of the modification shown in Fig. 3, showing the device as inclined from the horizontal.

Fig. 7 is a section of Fig. 6 on the line 7—7, and Fig. 8 is a section of Fig. 6 on the line 8—8.

Referring more particularly to the drawings and more especially to the modification shown in Figs. 1 and 2, a plurality of simultaneously rotatable drums A, B and Z of substantially the same diameter are placed end to end with their circumferential edges normally held in contact by suitable spring pressure. These drums are notched at A', B' and Z' to form (when the circumferential edges of the drums are in contact) triangular openings. When the drums are rotated these triangular openings are swept past the relatively stationary object to be plucked and remove the feathers which become wedged in the triangular slots. While the members A, B and Z are notched at A', B' and Z' in the ilustrated embodiment, it is evident, for instance, that the notch B' might be eliminated, the notch A' sufficing to form the feather wedging opening. The drums A, B and Z are separable relatively to each other to permit the feathers accumulated in the openings to be discharged to avoid impairing the effectiveness of the openings. In Fig. 1 drums A and Z are spaced, and this is effected by mounting drums A, B and Z on a plurality of parallel guide rods C which are enclosed in suitable lugs D. These lugs are preferably formed by bending the material of the drum so as to conform to the guide rod C and with sufficient clearance between them and the guide rod C so that they may freely move on these rods. In order that the drums with the edges A''' and B''' may be in contact with each other, the guide rods project through suitable bosses in the end of the terminal segment and have a spring F between the boss E and a nut G.

The opposite ends of the guide rods C are secured to an annular plate 13 secured to a sleeve K² journalled on the stationary shaft 10, one end of which is secured to the journal bearing K³. The journal bearing K³ is of sufficient length so that sufficient bearing is provided for the slight lateral movement required in opening the drum spaces. An annular exhaust casing L surrounds the portion of the drums including the tapered feather gripping openings and has its edges hermetically sealed against the rotating drum segments or parts by sealing wipers L². The annular exhaust chamber is supported on the frame of the device by a bracket L³ which holds the exhaust chamber stationary while permitting the drums to be rotated. The exhaust pipe L' also serves to support the chamber L. The inner periphery of the exhaust chamber has inwardly projecting pins L⁴ which serve to spread the drum parts A and B apart to release the feathers. The V-shaped member J is locked to the stationary shaft 10 by set screw 15 threaded in sleeve 14. The lower edges of the V-shaped member J have edging wiper strips 16.

In the modification shown in Fig. 1, the object is intended to be placed within the member formed by drums A, B and Z, and to this end suitable openings H are provided in one of the terminal drums. In Fig. 2 these openings are shown as slightly displaced with respect to the retaining walls J. The walls J may be, and preferably are formed from a single piece of sheet metal bent to form two depending walls and secured to the shaft 10 by bolts 15, the shaft being held stationary by pin 11. The walls J limit the movement of the object so that when the feathers are caught by the drum notches, the object will not be carried along with the rotating drum. In order to bring openings H to the position where the object may be placed in the V-shaped trough formed by the retaining walls J, the member consisting of drums A, B and Z may be rotated slightly to bring the opening H to a position where the object may be slipped through the opening into a V-shaped opening formed by the walls J. The object manifestly will take a position as shown at the bottom. The drums Z, A and B are rotated in the direction of the arrow shown in Fig. 1 by a suitable sleeve K driven from a gear K'. In order that a sufficient air draft be created from the interior of the cylinder outwardly so as to force the feathers into the opening formed by the tapered edges A', Z' and B', a vacuum jacket L surrounds the feather wedging slots A', Z' and B' so as to create an air draft outwardly from the interior of the cylinder formed by segments A and B. The vacuum jacket L has an outlet L' leading to a suitable draft producing device, as will be readily understood.

In operating this modification, the object is introduced into the interior of the cylinder formed by drums A, B and Z through the openings H, the object resting at the bottom of the cylinder as shown in Fig. 1 somewhere near the division of the segments A and B. The segments A and B are simultaneously rotated through the hollow shaft K rotating the terminal plate K'' of the terminal segment, this rotation causing the guide rods C to rotate therewith and thus cause both segments to rotate. As the tapered edges A', Z' and B' pass under the object to be plucked, and as the draft is applied through the conduit L' the feathers are sucked into the openings formed between the tapered edges A', Z' and B' and as the segments continue their rotation the feathers are caught at the point where the tapered edges A', Z' and B' come together. The rotation of the drums and the relative inertia of the object to be plucked cause the feathers to be pulled from the object. When the feathers are gripped the fowl is carried along with the segments until the fowl strikes the walls J, the fowl then rolling back to the lower part of the cylinder. In order that the feathers may not accumulate in the wedge shaped member formed by the tapered edges A', Z' and B' means are provided for intermittently separating these segments so as to release these feathers and this release is effected by having pins L⁴ suitably disposed in the path of the divisional line between the drums A, B and Z. When the wedge shaped opening formed by edges A', Z' and B' is opposite to the pin L⁴, the edges A''' and B''' are in contact. That is, the segments A and B close under the action of the springs F. When, however, the segments A and B rotate to a position where the pin strikes the tapered or cam edges A' and B', the segments are forced apart so as to release the feathers which have been caught. The action of drums A and Z is similar except that the action occurs at a different time due to a different location of the drum separating pin.

In the modification shown in Fig. 3, instead of the object being placed in the inside of the cylinder, the object is placed on the outer surface of two cylinders M and N whose axes preferably lie in the same plane inclined at an angle from the horizontal, as is more clearly shown in Fig. 6, the cylinders being placed close enough together so that the object will not drop between the cylinders, as shown very clearly in Fig. 3. The cylinders M and N are adapted to rotate in opposite directions as shown by the arrows on Fig. 3, the cylinders being driven by suitable gears M' and N', as will be readily understood from an inspection of Fig. 4. The cylinders M and N consist of a plurality of separable segments P and Q, these segments of the cylinder having lugs P' and Q' formed on the inside of the segment and having guide rods P'' and Q'' connecting the segments, with springs R interposed between the terminal segments and the nut R' in the manner similar to the segments described in connection with the modification shown in Figs. 1 and 2. The segments comprising a cylinder have tapered edges S similar to the tapered edges A' and B' described in connection with the modification shown in Figs. 1 and 2. These sections are separated by pins S' entering the wedge shaped openings S to intermittently spread the segments P and Q to release the feathers which may be caught in the wedge S. The rotation of the cylinders M and N in opposite directions with the object to be plucked lying between them as indicated in Fig. 3, causes the skin of the object to be stretched so that the removal of the feathers will not injure the skin. A casing T surrounds the cylinders and is closed by a cover T' at the top. This cover may be opened so as to drop the object in the trough formed between the adjacent cylinders M and N. The cylinders M and N are inclined from the horizontal as shown in Fig. 6 and the object is introduced at one end of the trough and is fed by gravity to the other end. The rotation of the cylinders M and N in opposite directions, causes the wedge shaped slots S to periodically pass in contact with the object to be plucked, and the partial vacuum produced in the interior of the cylinders M and N through the hollow shaft U causes the feathers to be drawn into the wedge shaped opening S and eventually worked down to the narrow part of the wedge and caught there. During the continued rotation, the wedge shaped openings in the cylinders M and N grip feathers on opposite sides of the object to be plucked and remove them. As the narrow part of the wedge shaped opening strikes the pin S' the segments P and Q are spread apart slightly on the tie or connecting rods P'' and Q'' so as to release the feathers.

In operating the device the cover T' is first opened and the object dropped to a position between the cylinders M and N which are rotating in opposite direction. The object rests between the cylinders, and as the wedge shaped grooves formed by the tapered edges of the segments of the cylinders pass the object, the feathers are sucked into the opening and on continued rotation of the cylinders are carried down to the narrowest part of the wedge shaped opening, where they are caught. The further rotation of the cylinders removes the feathers so caught.

This operation taking place simultaneously on opposite sides of the fowl and thereby stretching the skins so as to prevent injury thereto and also to prevent the skin from entering the wedge shaped opening irrespective of the grip of the feathers the skin is also continually stretched by the friction of the oppositely rotating cylinders. Due to the inclination of the cylinders from the horizontal, the object works itself from the higher end of the cylinders to the lower end. Preferably, the object is first placed in the device with the wings spread so that the lower face of the wings rests on the cylinders M and N to remove the feathers from beneath the wings, and if the plucking is not complete when the object has been passed once through the device it may be again introduced at the upper end of the cylinder to remove such feathers as were not removed at the initial plucking.

I claim:

1. A fowl plucking mach'ne comprising oppositely rotatable inclined members arranged side by side, said members having plucking means comprising V-shaped openings formed therein, the inclined members being arranged apart a sufficient distance so as to support the fowl.

2. A fowl-plucking machine comprising a rotatable cylindrical member composed of a plurality of coaxial hollow tubular sections of the same diameter, a portion of at least one circumferential edge of any pair of adjacent sections being cut so as to form a notch of increasing depth around said circumferential edge, so as to constitute, with the said adjacent section, a tapered feather-wedging opening.

3. A plucking machine comprising two adjacent members adapted to contact with an object to be plucked, the members being notched so as to form notches lying opposite each other so as to form a substantially triangular opening bounded by the walls of the notches, and means to move the members with respect to the object so that the feathers are wedged in the triangular opening.

4. A plucking machine comprising two adjacent members adapted to contact with an object to be plucked, one of the two members being notched to form a substantially triangular opening, and means to move the members with respect to the object so that the feathers are wedged in the triangular opening.

5. A machine of the character described comprising two adjacent members adapted to contact with an object to be plucked, one of the two members being notched to form a substantial triangular opening, and means to effect movement of the members and object relatively to each other so that the feathers are wedged in the triangular opening.

RALPH E. SLAYTON.